United States Patent
Adachi et al.

(10) Patent No.: US 8,427,570 B2
(45) Date of Patent: Apr. 23, 2013

(54) FOCUS POSITION CONTROL APPARATUS AND CAMERA

(75) Inventors: Kanato Adachi, Kawasaki (JP); Toshiyuki Nagaoka, Tokyo (JP)

(73) Assignee: Olympus Corporation, Tokyo (JP)

( * ) Notice: Subject to any disclaimer, the term of this patent is extended or adjusted under 35 U.S.C. 154(b) by 482 days.

(21) Appl. No.: 12/731,551

(22) Filed: Mar. 25, 2010

(65) Prior Publication Data
US 2010/0245657 A1  Sep. 30, 2010

(30) Foreign Application Priority Data
Mar. 26, 2009 (JP) .................. 2009-075727

(51) Int. Cl.
  *H04N 5/225* (2006.01)
  *G02B 13/16* (2006.01)
(52) U.S. Cl.
  USPC ............ 348/335; 348/340; 348/345; 348/348
(58) Field of Classification Search .................. 348/335, 348/340, 345, 348; 396/121, 79, 119; 355/18, 355/53, 112, 44
  See application file for complete search history.

(56) References Cited

U.S. PATENT DOCUMENTS

| | | | |
|---|---|---|---|
| 2002/0140838 A1* | 10/2002 | Yoshikawa | 348/345 |
| 2010/0038540 A1* | 2/2010 | Hannebauer | 250/338.1 |

FOREIGN PATENT DOCUMENTS

| | | |
|---|---|---|
| JP | 63-053510 | 3/1988 |
| JP | 01-246516 | 10/1989 |
| JP | 03-204277 | 9/1991 |
| JP | 05-045574 | 2/1993 |
| JP | 10-200904 | 7/1998 |
| JP | 2001-251648 | 9/2001 |
| JP | 2007-121580 A | 5/2007 |

OTHER PUBLICATIONS

Japanese Office Action dated Oct. 23, 2012.

* cited by examiner

*Primary Examiner* — Yogesh Aggarwal
(74) *Attorney, Agent, or Firm* — Pillsbury Winthrop Shaw Pittman, LLP (57) ABSTRACT

A focus position control apparatus includes a lens for forming an image from light from a subject, an imaging element and an imaging controller for performing photoelectric conversion on the subject image, lights having at least two different wavelengths or wavelength bands, on an imaging plane to generate at least a visible-region image signal and an infrared-region image signal, a focus-position movement mechanism for moving the lens in a direction along an optical axis relative to the imaging plane, a focusing state evaluator for evaluating a focusing state in each wavelength or wavelength band based on the generated visible-region image signal and infrared-region image signal, and a movement controller for driving the focus-position movement mechanism based on the evaluation result from the focusing state evaluator.

7 Claims, 9 Drawing Sheets

FOCUS POSITION CONTROL APPARATUS AND CAMERA

BACKGROUND OF THE INVENTION

1. Field of the Invention

The present invention relates to a focus position control apparatus and a camera.

This application claims priority to and the benefit of Japanese Patent Application No. 2009-075727 filed on Mar. 26, 2009, the disclosure of which is incorporated herein by reference.

2. Background Art

An exemplary conventional focus position control apparatus for performing autofocus in a digital camera, a video camera, and so on. controls a focus position using, for example, a scheme called a hill climbing control scheme or a through the lens (TTL) phase difference scheme in detecting a focus state of an imaging lens.

The hill climbing control scheme involves acquiring an image signal from an imaging element while moving an imaging lens in a direction along an optical axis, searching for a maximum peak value in a change of a focusing evaluation value of the image signal, and determining an imaging lens position, at which the maximum peak value is obtained, as a focusing position. For example, a contrast value in a focus area may be used as the focusing evaluation value.

The TTL phase difference scheme involves evaluating a focus state of an imaging lens and searching for a focusing position by dividing a pupil of an imaging lens into a pair of regions and detecting a relative change of positions of a pair of images formed by light flux passing through the divided pupil regions.

For example, in Japanese Patent Laid-open Publication No. 2007-121580, an autofocus apparatus for controlling a focus position using a hill climbing control scheme of calculating evaluation value data based on an image signal input to a sensor circuit via a lens while moving the lens step by step, and specifying the focusing position from a size of the evaluation value data is described.

In Japanese Patent Laid-open Publication No. 2007-121580, an origin position of a lens is detected when power is turned on, the lens is moved to a specific position at a very proximal side, and the lens is gradually moved from the specific position at the very proximal side to a distal side, for autofocus using a hill climbing scheme.

SUMMARY OF THE INVENTION

According to a first aspect of the present invention, a focus position control apparatus includes a photographing optical system for forming an image from light from a subject; an imaging unit for generating at least first and second image signals by performing photoelectric conversion on the subject image formed by the photographing optical system on an image plane with lights having at least two different wavelengths or wavelength bands, a focus-position movement mechanism for moving the photographing optical system in a direction along an optical axis relative to the imaging plane of the imaging unit; a focusing state evaluator for evaluating a focusing state in each wavelength or wavelength band based on the at least first and second image signals generated by the imaging unit; and a movement controller for driving the focus-position movement mechanism based on the evaluation result from the focusing state evaluator.

According to the present invention, the imaging unit generates the at least first and second image signals by performing the photoelectric conversion on the lights having at least two different wavelengths or wavelength bands. The focusing state evaluator evaluates the focusing state in each wavelength or wavelength band based on the at least first and second image signals generated by the imaging unit. The movement controller drives the focus-position movement mechanism based on the evaluation result from the focusing state evaluator, for focus position control in the photographing optical system.

In this disclosure, "lights having at least two different wavelengths or wavelength bands" indicate lights having at least two different wavelengths or lights having at least two different wavelength bands, The "different wavelength bands" are not limited to wavelength bands that do not overlap each other, but include wavelength bands in which one wavelength band includes part or all of the other.

Preferably, in the focus position control mechanism, the imaging unit generates the first image signal by performing the photoelectric conversion on visible light, and the second image signal by performing the photoelectric conversion on infrared light.

According to the present invention, since the imaging unit generates the first image signal by performing the photoelectric conversion on visible light and the second image signal by performing the photoelectric conversion on infrared light, color aberration for one of the visible light and the infrared light becomes noticeable by using a photographing optical system having aberration corrected for the other of the visible light and the infrared light, thereby easily detecting a difference between focusing status.

More preferably, in the focus position control apparatus, the imaging unit includes an imaging element for performing the photoelectric conversion; and a wavelength selection unit for selecting a wavelength of the light from the photographing optical system on a light path between the imaging element and the photographing optical system.

According to the present invention, since a wavelength of light arriving at the imaging element is selected using the wavelength selection unit disposed on the light path between the imaging element and the photographing optical system, the first and second image signals can be easily generated even with the imaging element in which light receiving sections having the same wavelength sensitivity are arranged.

More preferably, in the focus position control apparatus, the imaging unit includes an imaging element including first and second light receiving sections having a different relative wavelength sensitivity, one of the first and second light receiving sections has a greater relative sensitivity to one of the lights having at least two different wavelengths or wavelength bands, and the one of the first and second light receiving sections performs the photoelectric conversion on the one of the lights having at least two different wavelengths or wavelength bands to generate the first or second image signal.

According to the present invention, one of the first and second light receiving sections can perform the photoelectric conversion on one of the lights having the at least two different wavelengths or wavelength bands to generate the first or second image signal.

More preferably, in the focus position control apparatus, the focusing state evaluator includes a data storage for storing data of a defocus property of the photographing optical system in the at least two different wavelengths or wavelength bands, and performs evaluation of the focusing state from the first and second image signals based on the data of the defocus property stored in the data storage.

According to the present invention, since the data of the defocus property of the photographing optical system is stored in the data storage, the focusing state can be rapidly evaluated. Also, a plurality of defocus property data is stored in the data storage in advance or when required.

Further, according to another aspect of the present invention, a camera includes any one of the focus position control apparatuses.

According to the present invention, since the camera includes the focus position control apparatus, the camera has the same operation as any one of the inventions.

DETAILED DESCRIPTION OF THE INVENTION

Hereinafter, embodiments of the present invention will be described with reference to the accompanying drawings. The same numerals will be attached to the same or equivalent elements in all the drawings even in different embodiments, and common description will be omitted.

[First Embodiment]

A focus position control apparatus according to a first embodiment of the present invention and a camera including the focus position control apparatus will be described.

Figure 1:
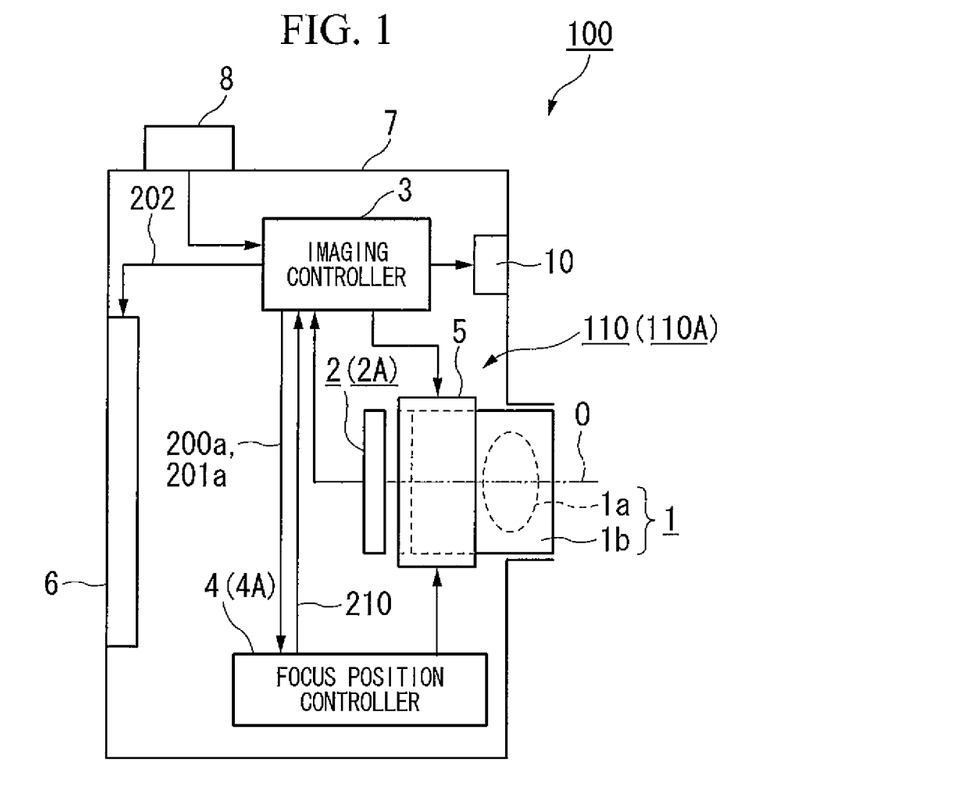
FIG. 1 is a cross-sectional diagram illustrating a schematic configuration of a camera including a focus position control apparatus according to a first embodiment of the present invention.
Figure 2:
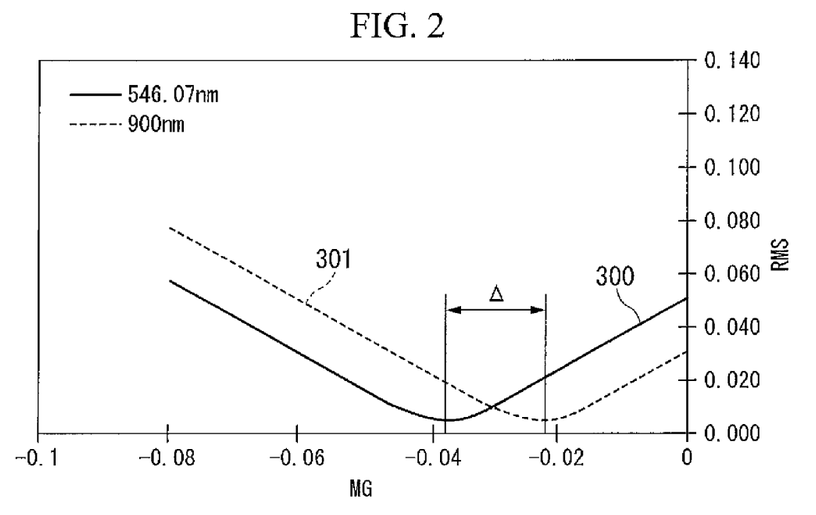
FIG. 2 is a graph illustrating color aberration of a photographing optical system used for the focus position control apparatus according to the first embodiment of the present invention
Figure 3:
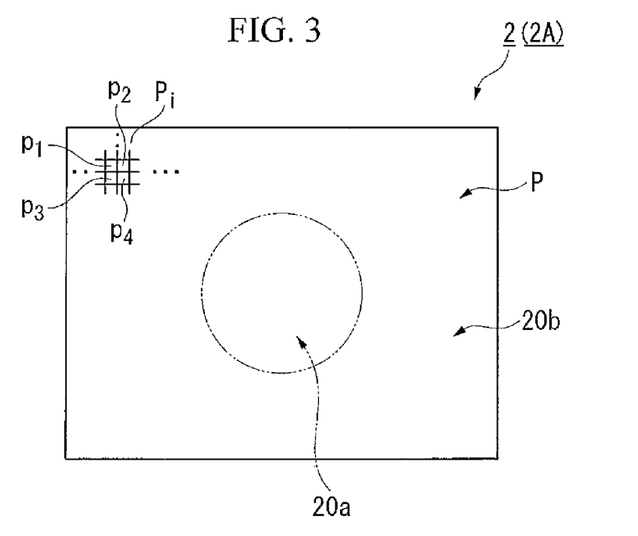
FIG. 3 is a diagram illustrating an imaging area of an imaging element used for the focus position control apparatus according to the first embodiment of the present invention.
Figure 4A:
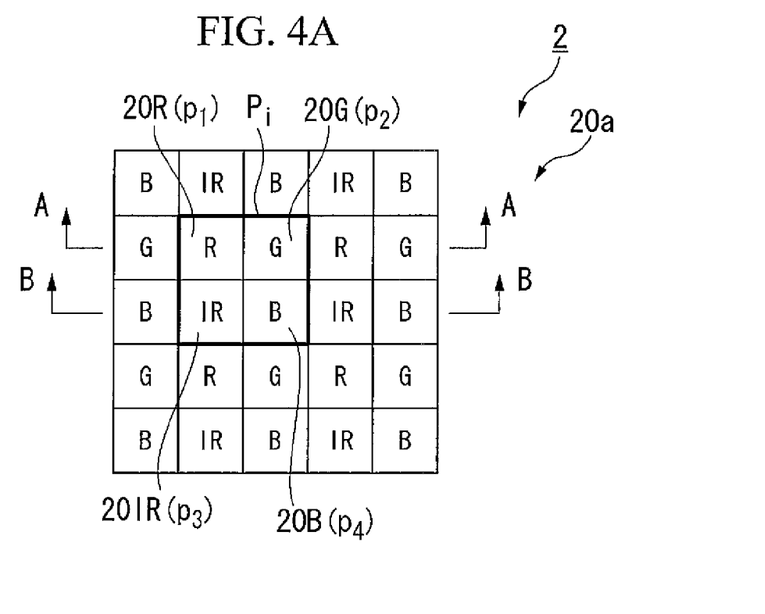
FIG. 4A is a partially enlarged diagram illustrating an arrangement of unit light receiving sections in a focusing-state evaluation area of an imaging element used for the focus position control apparatus according to the first embodiment of the present invention.
Figure 4B:
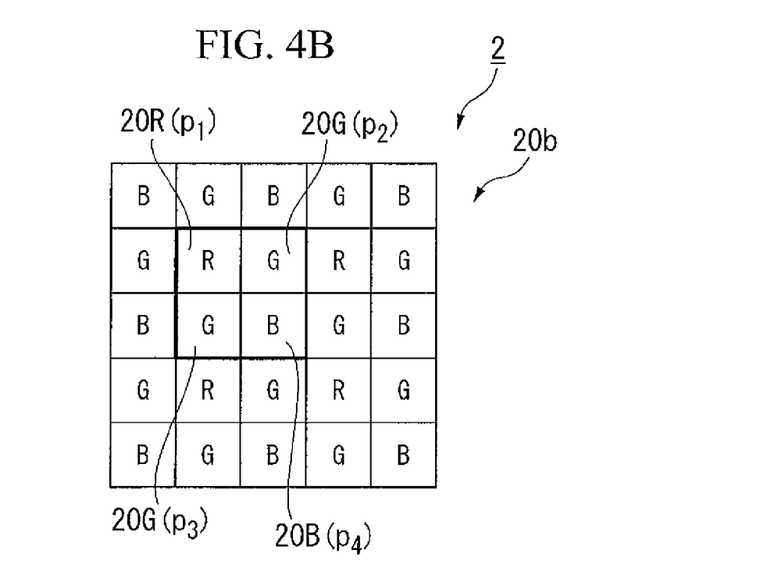
FIG. 4B is a partially enlarged diagram illustrating an arrangement of unit light receiving sections in a focusing-state non-evaluation area.
Figure 5A:
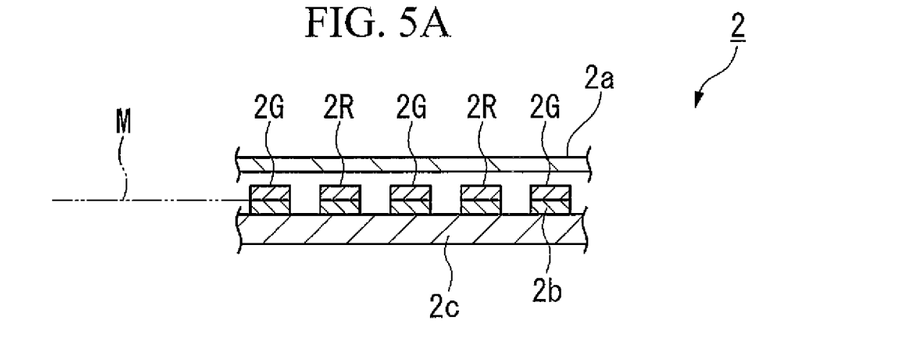
FIG. 5A is a cross-sectional view taken along a line A-A in FIG. 4B.
Figure 5B:
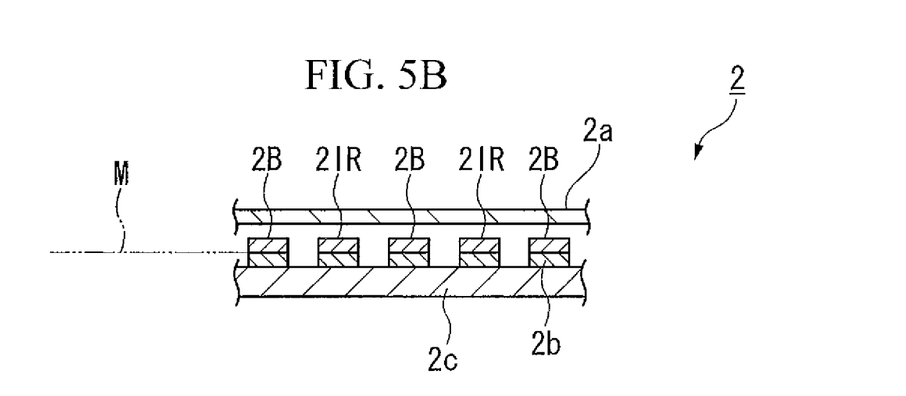
FIG. 5B is a cross-sectional view taken along a line B-B.
Figure 6:
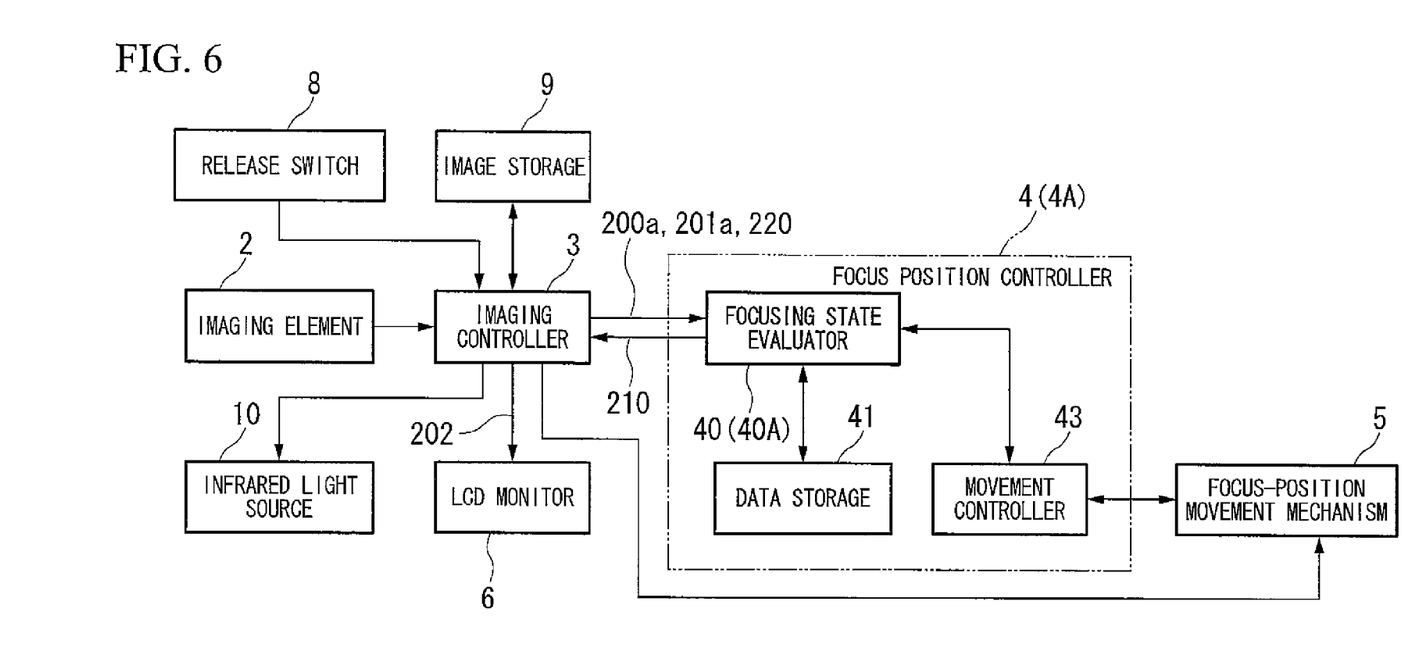
FIG. 6 is a functional block diagram illustrating a functional configuration of a control unit of the focus position control apparatus according to the first embodiment of the present invention.
Figure 7:
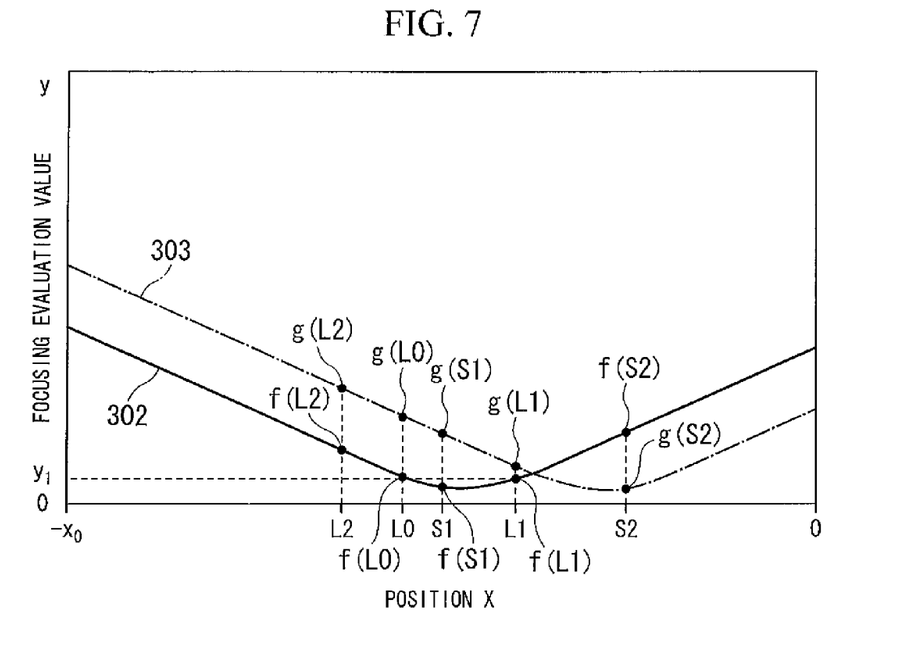
FIG. 7 is a diagrammatic graph illustrating a relationship between a focus position and a focusing evaluation value in the focus position control apparatus according to the first embodiment of the present invention.

FIG. 1 shows a cross-sectional diagram illustrating a schematic configuration of the camera including the focus position control apparatus according to the first embodiment of the present invention. FIG. 2 shows a graph illustrating color aberration of a photographing optical system used for the focus position control apparatus according to the first embodiment of the present invention. A horizontal axis indicates lateral magnification and a vertical axis indicates a RMS value of a light flux. FIG. 3 shows a diagram illustrating an imaging area of an imaging element used for the focus position control apparatus according to the first embodiment of the present invention. FIGS. 4A and 4B show partially enlarged diagrams illustrating arrangements of unit light receiving sections in a focusing-state evaluation area and a focusing-state non-evaluation area of the imaging element used for the focus position control apparatus according to the first embodiment of the present invention, respectively. FIGS. 5A and 5B show a cross-sectional view taken along a line A-A in FIG. 4B and a cross-sectional view taken along a line B-B, respectively. FIG. 6 shows a functional block diagram illustrating a functional configuration of a control unit of the focus position control apparatus according to the first embodiment of the present invention. FIG. 7 shows a diagrammatic graph illustrating a relationship between a focus position and a focusing evaluation value in the focus position control apparatus according to the first embodiment of the present invention. A horizontal axis indicates a position in a direction along an optical axis, and a vertical axis indicates the focusing evaluation value.

The focus position control apparatus of the present embodiment is preferably used for, for example, imaging devices, such as digital still cameras, video cameras, etc. The focus position control apparatus can also be used for, for example, information devices with a camera, such as notebook computers, cellular phones, and personal digital assistants (PDAs).

Hereinafter, the present embodiment will be described based on a focus position control apparatus 110 for performing focus position control in a camera 100 that is a compact digital camera for general photographing purposes as an example, as shown in FIG. 1. The camera 100 of the present embodiment is a camera for photographing a subject in a visible light region.

A camera 100 includes a photographing lens unit 1, an imaging element 2, a focus-position movement mechanism 5, a LCD monitor 6, a release switch 8, an imaging controller 3, an infrared light source 10, and a focus position controller 4, which are disposed in a camera case 7.

Particularly, the focus position control apparatus 110 includes the imaging element 2, the imaging controller 3, the focus-position movement mechanism 5, and a focusing state evaluator 40 and a movement controller 43 included in the focus position controller 4, which will be described below.

In the photographing lens unit 1, a lens 1a that is a photographing optical system for forming an image on an imaging plane of the imaging element 2 using light from a subject is accommodated in a lens barrel 1b. The lens barrel 1b is maintained movably along an optical axis O by the focus-position movement mechanism 5 installed in the camera case 7.

Further, since FIG. 1 is a diagram, the lens 1a is shown as a single lens. However, the lens 1a is not limited to the single lens, but may consist of a group of lenses.

Also, for the lens 1a, an arbitrary lens can be employed as long as the lens can form an image of a subject on the imaging element 2 according to a proper magnification. For example, the lens 1a may be a fixed focal lens or may be a variable focusing lens.

Also, in the present embodiment, the photographing lens unit 1 is assembled in a main body of the camera 100 and not exchangeably installed. However, for example, a replacement mount may be installed in the main body of the camera 100 so that the lens unit 1 can be detachably and exchangeably installed. In this case, the type of a replaced lens can be identified by the imaging controller 3, which will be described below, by mounting the photographing lens unit 1 to the replacement mount.

In the present embodiment, an aberration of the lens 1a is corrected in light in a visible region, as in a general lens for a camera. Accordingly, the lens 1a has color aberrations in lights of wavelength regions other than the visible region, such as the infrared region, the ultraviolet region, etc.

FIG. 2 shows an example of focus position deviation caused by the color aberration of the lens 1a. In FIG. 2, a spreading diameter of a light flux from a photographic subject is plotted by an RMS value attempting to photograph an object from the very proximal position to the infinitely distal position, when a focus position of the lens 1a having a focal length of 14.25 mm relative to an imaging plane M is set to a position of MG=−0.033, which is an intermediate state between infinitely distant and very near positions. Here, a horizontal axis indicates a lateral magnification MG corresponding to an object distance. That is, MG=0 indicates that the object distance is at the infinitely distal position, and an increasing absolute value of a negative MG indicates that the object distance is closer to the very proximal position.

The curve 300 shows a change in a wavelength of 546.07 nm, which corresponds to light of the visible region, and the curve 301 shows a change in a wavelength of 900 nm that corresponds to light of the infrared region.

Since the lens 1a is not a non-aberration lens, the lens 1a has finite spreading according to a wavelength. Accordingly, both of the curves 300 and 301 show a generally V-shaped change in which a bottom portion is curved, with RMS values taking extreme values that are minimum values at lateral magnifications MG=−0.038 and MG=−0.022, respectively. These extreme values correspond to respective focus positions. It can be seen that the extreme value at the wavelength of 900 nm deviates by Δ=0.016 from the extreme value at the wavelength of 546.07 nm, and an image forming position of light having the wavelength of 900 nm deviates toward an image by 0.190 mm relative to an image forming position of light having the wavelength of 546.07 nm.

Also, as the RMS value of the light flux diameter increases, the image is blurred and contrast is lowered.

A plurality of unit light receiving sections are disposed in the imaging element 2, and each unit light receiving section performs photoelectric conversion on an image of light formed via the lens 1a to generate an imaging signal. For example, a CCD or CMOS sensor can be employed.

In the present embodiment, pixels $P_i$ each consisting of unit light receiving sections $p_1$, $p_2$, $p_3$ and $p_4$ are arranged in a lattice by a number corresponding to a photographing pixel number in a rectangular imaging area P, as shown in FIG. 3.

In the present embodiment, the unit light receiving sections include a red (R) light receiving section 20R, a green (G) light receiving section 20G, and a blue (B) light receiving section 20B that receive respective color components for R, G, and B, the three primary colors of light, in order to photograph a color image of light of the visible region, as shown in FIGS. 4A and 4B. The unit light receiving sections further include an infrared region (IR) light receiving section 20IR for receiving IR light to acquire an imaging signal used for focus position control.

The imaging area P includes a focusing-state evaluation area 20a provided at a central portion thereof for acquiring an imaging signal for subject photographing and an imaging signal used for focusing state evaluation, as shown in FIG. 3. A region other than the focusing-state evaluation area 20a is a focusing-state non-evaluation area 20b for acquiring only the imaging signal for subject photographing.

Although the focusing-state evaluation area 20a in the present embodiment is a circular area at a center of the imaging area P, the focusing-state evaluation area 20a may be an area having another shape, such as a rectangle or other polygon. A set position of the focusing-state evaluation area 20a is not limited to the center, however, a central area of the imaging area P is preferable where the aberration of the lens 1a is corrected for better focusing precision.

In the focusing-state evaluation area 20a, the unit light receiving sections $p_1$, $p_2$, $p_3$, and $p_4$ of each pixel $P_i$ consist of the R light receiving section 20R, the G light receiving section 20G, the IR light receiving section 20IR, and the B light receiving section 20B, respectively, as shown in FIG. 4A.

Also, in the focusing-state non-evaluation area 20b, the unit light receiving sections $p_1$, $p_2$, $p_3$, and $p_4$ of each pixel $P_i$ consist of the R light receiving section 20R, the G light receiving section 20G, the G light receiving section 20G, and the B light receiving section 20B, respectively, as shown in FIG. 4B.

The arrangement of the unit light receiving sections in the focusing-state non-evaluation area 20b is an arrangement known as a Bayer arrangement RGGB, and the arrangement of the unit light receiving sections in the focusing-state evaluation area 20a is an RG(IR)B arrangement obtained by substituting the IR light receiving section 20IR for the G light receiving section 20G in the Bayer arrangement.

As a sectional configuration of the imaging element 2, a circuit board 2c having a power line and a circuit for transferring an imaging signal, light receiving sections 2b, and a cover glass 2a are arranged in laminae, as shown in FIGS. 5A and 5B.

The light receiving sections 2b are sensor sections for performing photoelectric conversion and have sensitivity to lights having wavelengths in the visible region and infrared region. The light receiving sections 2b are arranged in a lattice on the circuit board 2c to correspond to the arrangement of the unit light receiving sections $p_1$, $p_2$, $p_3$, and $p_4$ of each pixel $P_i$. Light receiving planes of the respective light receiving sections 2b are aligned to be coplanar and form an imaging plane M.

An R filter 2R, a G filter 2G, a B filter 2B, and an IR filter 2IR for selecting a wavelength of an incident light are formed on the respective light receiving sections 2b according to areas of the R light receiving section 20R, the G light receiving section 20G, the B light receiving section 20B, and the IR light receiving section 20IR.

The R filter 2R, the G filter 2G, and the B filter 2B transmit only light in wavelength bands of R, G and B, the three primary colors of light, respectively.

The IR filter 2IR performs wavelength selection by transmitting only infrared light that the light receiving section 2b has sensitivity, including at least light of a wavelength from the infrared light source 10, which will be described below.

Also, although not shown in the drawings, similarly, an R filter 2R, a G filter 2G, and a B filter 2B for selecting a wavelength of incident light are formed on the respective light receiving sections 2b in the focusing-state non-evaluation area 20b according to areas of the R light receiving section 20R, the G light receiving section 20G, and the B light receiving section 20B.

The focus-position movement mechanism 5 maintains the lens barrel 1b of the photographing lens unit 1 so that the lens barrel 1b can move along the optical axis O of the lens 1a, and moves the focus position of the lens 1a relative to the imaging plane M according to a control signal from the imaging controller 3 and the focus position controller 4.

In the present embodiment, although not shown in the drawings, a mechanism for delivering a rotational force of a stepping motor, etc. to a linear motion mechanism such as a ball screw to move the lens barrel 1b along the optical axis O is employed as the focus-position movement mechanism 5. Otherwise, a known linear motion mechanism, such as an actuator or a linear motor, can be properly employed.

The LCD monitor 6 is a display unit for displaying an image obtained by the imaging element 2, an operational screen for operating or setting the camera 100, and the like.

The release switch 8 is an operation switch for opening a shutter and is electrically connected to the imaging controller 3. A control signal for an autofocus operation is sent to the imaging controller 3, for example, by half-pressing the release switch 8.

The imaging controller 3 controls an overall operation of the camera 100. For example, the imaging controller 3 is electrically connected to an operation unit (not shown), which consists of a button, a switch, a dial, or the like, the LCD monitor 6, the focus-position movement mechanism 5, the imaging element 2, the release switch 8, the focus position controller 4, the imaging element 2, the infrared light source 10, and the like.

For example, the imaging controller 3 can perform the following operations.

That is, the imaging controller 3 receives an operation input from the operation unit, controls an imaging operation based on the operation input, displays the image on the LCD monitor 6, and displays the operational screen.

The imaging controller 3 also controls the focus-position movement mechanism 5 to move the photographing lens unit 1 in a direction along the optical axis O. In the camera 100 of the present embodiment, if power is turned on, the imaging controller 3 drives the focus-position movement mechanism 5 to initialize the position of the photographing lens unit 1 in the direction along an optical axis O. In the present embodiment, the photographing lens unit 1 is moved to a position at which a position of a focal plane relative to an infinitely distal subject corresponds to the imaging plane M. Hereinafter, the initialized position is referred to as a reference position.

The infrared light source 10 emits light based on a control signal from the release switch 8 to perform the autofocus operation.

The infrared light source 10 is a light source for generating light of the infrared region to which the light receiving section 2b has sensitivity, in order to obtain an image of the subject using the infrared light.

Preferably, the infrared light has a wavelength ranging from 700 nm to 1300 nm. This wavelength range is preferable because, in such a wavelength range, an imaging element used for a general-purpose electronic imaging device has sufficient light-receiving sensitivity and the autofocus can be performed without separate modification.

For example, in the present embodiment, an LED light source for a wavelength of 900 nm is included as the light source.

In a case the photographing lens unit 1 is exchangeably installed, the photographing lens unit 1 has readable identification information for specifying an optical property of the lens 1a, and the imaging controller 3 reads the identification information from the photographing lens unit 1 mounted to the replacement mount to specify the optical property of the lens 1a. The identification information may be read using, for example, an optical sensor (not shown), and so on disposed in the camera 100 or may be electrically read via a junction of the replacement mount. Alternatively, an IC chip, for example, storing the identification information may be installed in the photographing lens unit 1 and the identification information may be read through communication with the IC chip.

The imaging controller 3 performs noise cancellation, shading correction, or the like on the imaging signal obtained through photoelectric conversion in the imaging element 2, as necessary, performs A/D-conversion to acquire an image signal, and stores the image signal in the image storage 9 (see FIG, 6). A visible-region image signal 200a (a first image signal) and an infrared-region image signal 201a (a second image signal) for focus position control, and a photographing image signal 202, which is a subject image after focusing completion, can be generated from the image signal stored in the image storage 9.

The generated visible-region image signal 200a and infrared-region image signal 201a are sent to the focus position controller 4 together with a lens information signal 220 for specifying the type, the focal length, and so on of the lens 1a at a time when these image signals are generated. When the lens 1a is a variable focusing lens, the lens information signal 220 is, for example, information on focal length set by the operation unit. Also, when the lens 1a is a replacement lens, the lens information signal 220 includes identification information for the lens 1a read from the photographing lens unit 1.

However, when the lens 1a is a fixed focal lens but not a replacement lens, the lens information signal 220 may be omitted.

The generated photographing image signal 202 is sent to and displayed on the LCD monitor 6 and sent to and stored in the image storage 9.

The visible-region image signal 200a and the infrared-region image signal 201a are both generated based on an image signal of each pixel $P_1$ in the focusing-state evaluation area 20a of the imaging element 2 when a control signal for autofocus operation is detected from the release switch 8, and stored in the image storage 9.

The visible-region image signal 200a is generated by summing light-receiving luminances of the R light receiving section 20R, the G light receiving section 20G, and the B light receiving section 20B in each pixel $P_i$ of the focusing-state evaluation area 20a. Accordingly, the visible-region image signal 200a indicates monochrome luminance of the visible light.

The infrared-region image signal 201a is generated from light-receiving luminance of the IR light receiving section 20IR in each pixel $P_i$ of the focusing-state evaluation area 20a.

When a state is evaluated as a focusing state by the focus position controller 4, the photographing image signal 202 is obtained by combining a color resolution signal of the visible light based on light-receiving luminance of the R light receiving section 20R, the G light receiving section 20G, and the B light receiving section 20B in each pixel $P_i$ of the focusing-state evaluation area 20a and a color resolution signal of the visible light based on light-receiving luminance of the R light receiving section 20R, the two G light receiving sections 20G, and the B light receiving section 20B in each pixel $P_i$ of the focusing-state non-evaluation area 20b.

However, for the luminance of the G light receiving section 20G, the luminance itself is employed in the focusing-state evaluation area 20a, and the average luminance of the two G light receiving sections 20G is employed in the focusing-state non-evaluation area 20b.

The imaging controller 3 may consist of only hardware including a proper control circuit, but in the present embodiment, the imaging controller 3 includes a computer having a CPU, a memory, and an input/output interface. A program corresponding to respective control functionalities is executed by the computer.

The imaging element 2 and the imaging controller 3 constitute an imaging unit for generating the visible-region image signal 200a and the infrared-region image signal 201a by performing photoelectric conversion on a subject image formed by the lens 1a with lights having two different wavelength bands.

The focus position controller 4 includes the focusing state evaluator 40, a data storage 41, and the movement controller 43, as shown in FIG. 6, The focusing state evaluator 40 evaluates a focusing state in each wavelength band based on the visible-region image signal 200a and the infrared-region image signal 201a generated by the imaging controller 3.

In the present embodiment, image processing is performed on the visible-region image signal 200a and the infrared-region image signal 201a to calculate focusing evaluation values from the respective image signals.

Focusing evaluation value may be employed on the condition that the focusing evaluation value has a maximum or minimum extreme value in a focusing state, in which an image signal in the focusing-state evaluation area 20a is used as a variable. For example, a focusing evaluation value such as a high-frequency component size, a luminance size, or a point spread function (PSF) of the image can be employed.

The focusing state evaluator 40 evaluates the focusing evaluation values calculated according to the visible-region image signal 200a and the infrared-region image signal 201a, based on reference data indicating a relationship (a defocus property) between each focusing evaluation value and a focus position of the visible light, which is stored in the data storage 41, and calculates a movement amount in the direction along the optical axis O for movement to the focusing position. The focusing state evaluator 40 sends information on the movement amount to the movement controller 43.

When movement completion is detected from the movement controller 43, the focusing state evaluator 40 also sends a focusing completion signal 210 to the imaging controller 3.

The focusing state evaluator 40 may consist of only hardware including a proper control circuit. However, in the present embodiment, the focusing state evaluator 40 includes a computer having a CPU, a memory, and an input/output interface. This computer may be a computer used for the imaging controller 3.

In the present embodiment, the data storage 41 includes a ROM and a RAM.

The ROM can store a plurality of types of reference data. For example, when the lens 1a is a variable focusing lens, the ROM can store reference data according to a focal length of the lens 1a, as the plurality of types of reference data. Also, when the lens 1a is exchangeably installed, the ROM can store reference data according to a specific optical property of each replacement lens.

The RAM stores reference data used for focus position control that is called for among the plurality of types of reference data stored in the ROM. The reference data in the RAM that is called for may be referenced by the focusing state evaluator 40.

In a case that the lens 1a is a fixed focal lens, but not a replacement lens, there may be one type of reference data.

FIG. 7 shows an example of the reference data stored in the data storage 41.

In FIG. 7, the position of the lens 1a in the direction along the optical axis relative to the imaging plane M is represented by a coordinate system in which 0 is a reference position and a direction of the photographing lens unit 1 toward a very proximal position, i.e., toward the object is negative. $-x_O$ indicates a limit of the very proximal position.

Further, the coordinate system is utilized in an unrestricted handling way, and when another coordinate system is employed, a description of a size relationship or positive and negative directions according to such a coordinate system should be properly adapted.

While in a general-purpose photographing optical system, a visible region aberration has been corrected, there are many cases in which infrared region aberrations are not corrected. That is, focusing states of visible light and infrared light on the plane of the imaging element differ.

A variation of the focusing evaluation value for the visible-region image signal 200a with a position x is represented by $y=f(x)$. That is, a generally V-shaped variation in which a bottom portion is curved, as indicated by a curve 302, is shown and the variation takes an extreme value, which is a minimum value, at x=S1 corresponding to the bottom portion. The focusing evaluation value increases approximately linearly as the position x departs from the position S1.

Meanwhile, a variation of the focusing evaluation value for the infrared-region image signal 201a with the position x is represented by $y=g(x)$. That is, a general V shape in which a bottom portion is curved, as indicated by a curve 303, is shown, and the variation takes an extreme value, which is a minimum value, at x=S2 corresponding to the bottom portion. The focusing evaluation value increases approximately linearly as the position x departs from the position S2.

Here, a difference between the positions S1 and S2 is equal to a deviation amount of the focal length corresponding to the color aberration of the lens 1a. Also, the function types of $f(x)$ and $g(x)$ correspond to a change of the focusing state by the lens 1a, and can be calculated from lens data of the lens 1a according to the type of the focusing evaluation value. Even when the function type cannot be directly calculated, the function type can also be determined experimentally using a subject such as a test chart, for example, in advance by photographing the subject while changing a position of the subject.

Also, respective coefficients when the functions $f(x)$ and $g(x)$ are represented by approximation formulas, etc. may be stored for the reference data, or the reference data may be stored as table data consisting of the position x and the function values $y=f(x)$ and $y=g(x)$.

The movement controller 43 sends a control signal to the focus-position movement mechanism 5 to move the photographing lens unit 1 by the movement amount sent from the focusing state evaluator 40.

Next, an operation of the camera 100 will be described with respect to an autofocus operation.

Figure 8:
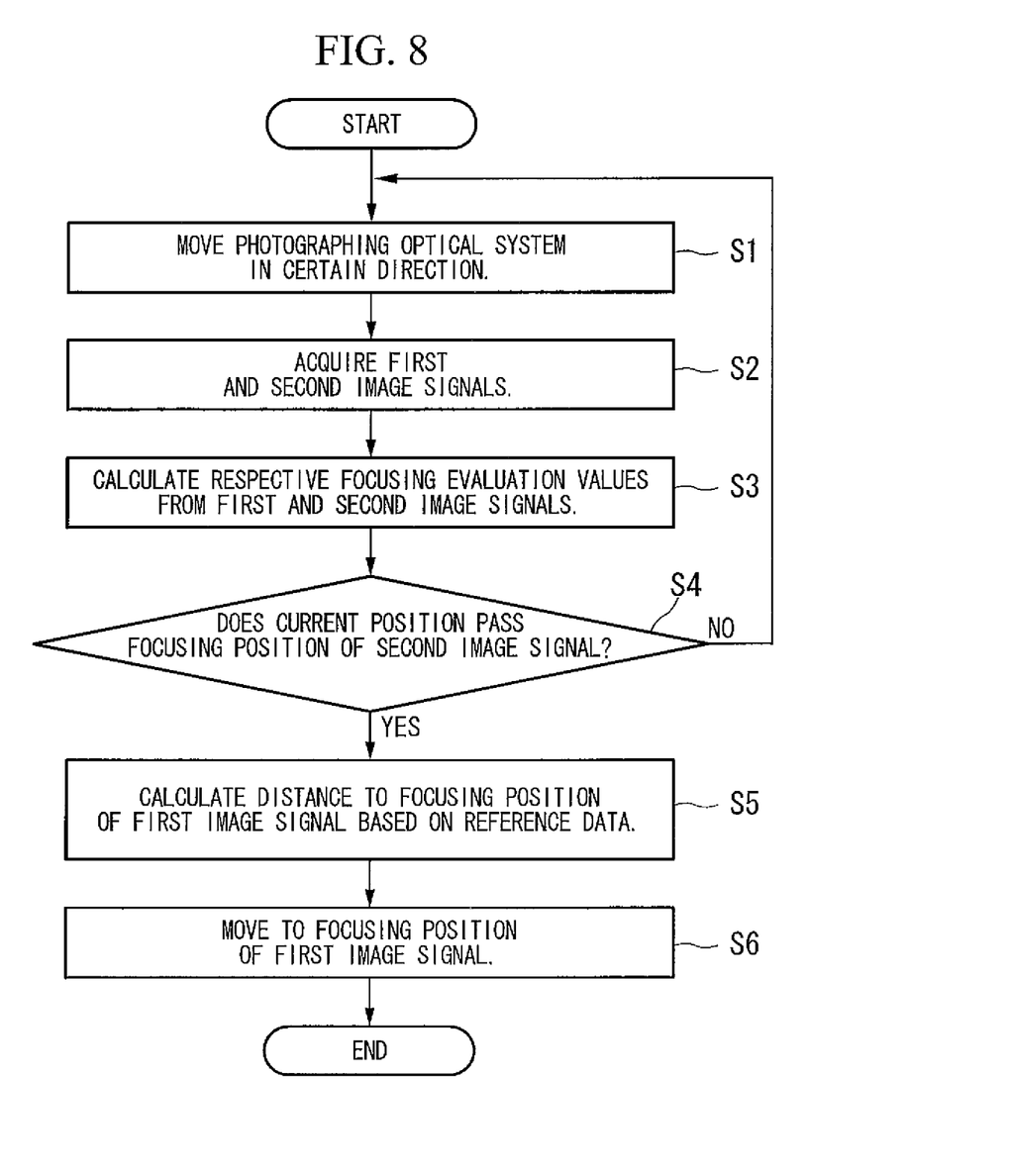
FIG. 8 is a flowchart illustrating autofocus control in the focus position control apparatus according to the first embodiment of the present invention.

FIG. 8 shows a flowchart illustrating autofocus control in the focus position control apparatus according to the first embodiment of the present invention.

In the camera 100 of the present embodiment, when the power is turned on, an initialization operation of the overall apparatus is performed. For example, the imaging controller 3 drives the focus-position movement mechanism 5 to move the photographing lens unit 1 to the reference position.

When a photographer half-presses the release switch 8, light is emitted from the infrared light source 10 by the imaging controller 3 and the autofocus control starts according to a flow shown in FIG. 8.

In step S1, the imaging controller 3 drives the focus-position movement mechanism 5 to move the photographing lens unit 1 in a certain direction along the optical axis O from the reference position. In the present embodiment, the imaging controller 3 moves the photographing lens unit 1 from the reference position to a lens position corresponding to a very proximal position, i.e., in a direction toward the object. In the present embodiment, since a stepping motor is used for driving, a movement amount from the reference position changes stepwise. One driving amount can be properly set according to the focusing precision.

Next, in step S2, the imaging controller 3 forms an image of a subject using the imaging element 2 to generate a visible-region image signal 200a and an infrared-region image signal 201a. The imaging controller 3 sends the visible-region image signal 200a and the infrared-region image signal 201a as first and second image signals, respectively, to the focusing state evaluator 40.

Also, the imaging controller 3 also sends a lens information signal 220 to the focusing state evaluator 40.

Next, in step S3, the focusing state evaluator 40 performs computational processing on the visible-region image signal 200a and the infrared-region image signal 201a to calculate respective focusing evaluation values. In this case, the calculation of the focusing evaluation values is performed by calling data or a data table indicating a proper function type by selecting the type of the reference data stored in the data storage 41 according to the lens information signal 220.

For example, when a current position is x, the respective focusing evaluation values are f(x) and g(x).

The calculated focusing evaluation values f(x) and g(x) are stored in the data storage 41 together with position information x represented by a driving amount of the focus-position movement mechanism 5.

Next, in step S4, a determination is made as to whether the current position x passes the focusing position S2 of the infrared light in a negative direction by referring to the focusing evaluation value g(x) of the infrared-region image signal 201a and the reference data, which has been stored in the data storage 41 in advance and selected based on the lens information signal 220. Here, in order to prevent wrong determination, an intermediate position L1 between the focusing positions S2 and S1 is used as a criterion, and when x≦L1, it is determined that the current position x passes the focusing position S2 in the negative direction.

Since the reference data are represented by the approximately V-shaped curves, as indicated by the curves 302 and 303 in FIG. 7, there are two positions x of the photographing lens unit 1 for one focusing evaluation value on each curve, excluding the focusing positions S1 and S2. At the two positions, one position can be identified by referring to the focusing evaluation value of the other position.

For example, when the focusing evaluation value calculated from the visible-region image signal 200a is y1, a position corresponding to y1 is likely to be one of the positions L1 and L0 (where, L0<L1) because y1=f(L1)=f(L0).

Meanwhile, since the focusing evaluation values of the infrared-region image signal 201a differ: g(L1)<g(L0), a determination can be made as to whether the position is L1 or L0 by comparing the calculated focusing evaluation values of the infrared-region image signal 201a with g(L1) and g(L0) of the reference data.

Accordingly, a position relationship between the current position x and the focusing positions S1 and S2 can be recognized based on the reference data from values of f(x) and g(x).

When it is determined that the current position x is in a positive direction from the focusing position S2 and does not pass the focusing position S2 in a negative direction, that is, when it is determined that the current position x does not pass the focusing position S2 or the current position x passes the focusing position S2 but does not pass the position L1, the flow returns to step S1 to iteratively perform steps S1, S2 and S3.

When it is determined that the current position x passes, for example, L1 and is in the negative direction from the focusing position S2, the flow proceeds to step S5.

In step S5, the focusing evaluation values g(x) stored in the data storage 41 in step S3 are compared with each other to search for a minimum value $y_{min}=g(x_2)$ and obtain a position $x_2$ corresponding to the minimum value $y_{min}$. The focusing position $x_1$ of the subject by the visible light is obtained by the following equation using a difference between the focusing positions S2 and S1 stored in the reference data:

$$x_1 = x_2 + (S1 - S2) \tag{2}$$

Next, in step S6, a difference $\Delta x$ between the position $x_1$ obtained in step S5 and the current position x in step S5, represented by the following equation, is sent to the movement controller 43.

$$\Delta x = x_1 - x \tag{2}$$

The movement controller 43 sends a control signal to the focus-position movement mechanism 5 to drive the photographing lens unit 1 by $\Delta x$ from the current position x to the object. Accordingly, the photographing lens unit 1 is moved to the position $x_1$.

When the movement to the position $x_1$ is completed, the movement controller 43 notifies the focusing state evaluator 40 of movement completion. The focusing state evaluator 40 sends a focusing completion signal 210 to the imaging controller 3.

Thus, focusing is completed.

When detecting the focusing completion signal 210, the imaging controller 3 provides an indication to inform the photographer of focusing completion, as necessary, and permits a shutter to be released by the release switch 8. Accordingly, the photographer can perform photographing by releasing the shutter.

Further, when the lens 1a is a variable focusing lens and a focal length is changed by the operation unit, the changed focal length is detected and the lens information signal 220 sent in step S2 is changed by the imaging controller 3. Also, when the lens 1a is a replacement lens and lens replacement is attempted, an optical property of the replaced lens 1a is acquired upon replacement and the lens information signal 220 sent in step S2 is changed by the imaging controller 3.

Accordingly, in the present embodiment, even when the focal length is changed or the lens 1a is replaced, the focusing evaluation values can be calculated and the reference data can be automatically changed according to the focal length and the lens type.

As described above, according to the present embodiment, the imaging element 2 includes the IR light receiving section 20IR, such that the visible-region image signal 200a and the infrared-region image signal 201a can be acquired. The focusing position $x_2$ is detected from the infrared-region image signal 201a based on the infrared light, and the autofocus operation can be performed to move the photographing lens unit 1 to the focusing position $x_1$ by the visible light using the defocus property of the infrared light and the visible light determined by the color aberration of the lens 1a, which is stored as the reference data.

In the present embodiment, since the autofocus is performed by moving the photographing lens unit 1 from the reference position corresponding to the infinitely distal position to the object, the photographing lens unit 1 can move to detect the focusing position $x_2$ at a side of a long wavelength closer to the reference position corresponding to the infinitely distal position and then move to the focusing position $x_1$ in the same direction.

Accordingly, since the focusing position $x_2$ by the infrared light closer to the reference position is detected and then the photographing lens unit 1 is continuously moved to the focusing position $x_1$ of the visible light, the focusing state can be detected in a short time and the photographing lens unit 1 can be more rapidly moved to the focusing position in comparison with conventional autofocus control in which the focusing position $x_1$ of the visible light at a shorter wavelength side than infrared light is detected by moving the lens while evaluating the focusing state step by step from the reference position corresponding to the infinitely distant position. Accordingly, a faster focusing operation can be achieved.

Also, since the photographing lens unit 1 is moved in one direction from the reference position corresponding to the infinitely distal position to a very proximal side for focusing as described above, a focusing operation can be performed without detecting the focusing position $x_1$ and then returning a lens position once in a reverse direction to move back to the focusing position $x_1$, as in a conventional art. Thus, fast focusing can be performed. Also, even when the focus-position movement mechanism 5 employs, for example, a mechanism in which a movement position error is easily generated due to back lash, for example, of a driving mechanism, a movement position error due to a changed movement direction is not generated, resulting in high-precision focusing.

Also, autofocus can be performed by a simple configuration without an optical system for splitting a light beam passing through the photographing lens and a light sensor for detecting a position of the split light beam in a conventional TTL phase difference detection scheme.

Next, a variant of the first embodiment will be described.

Figure 9A:
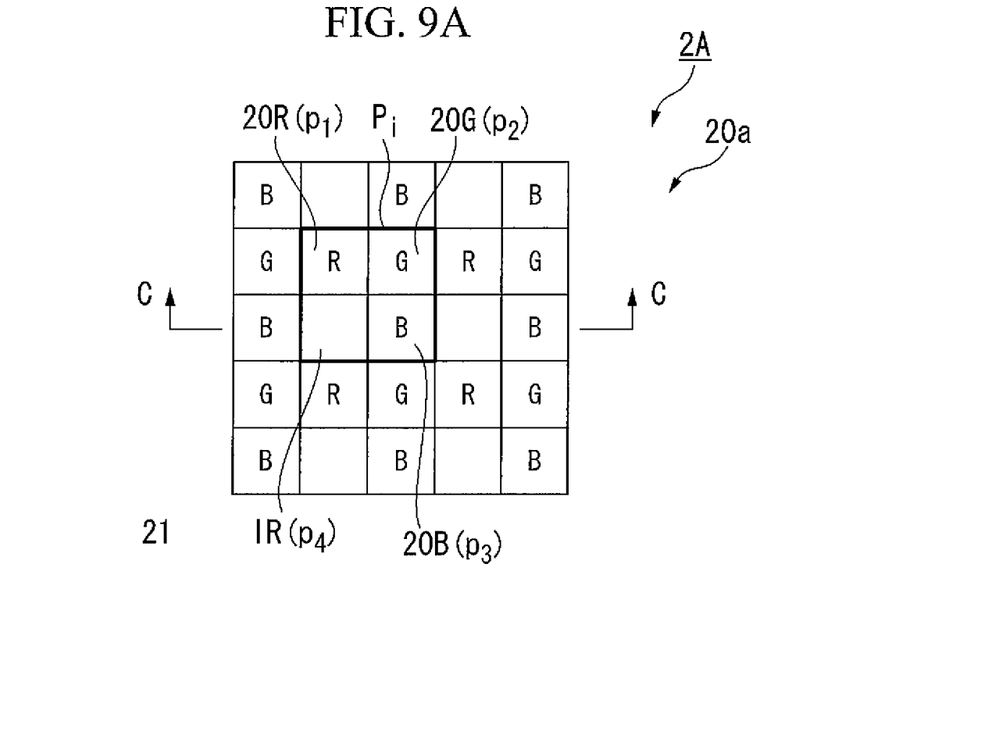
FIG. 9A is a partially enlarged diagram illustrating an arrangement of unit light receiving sections in a focusing-state evaluation area of an imaging element used for a focus position control apparatus according to a variant of the first embodiment of the present invention.
Figure 9B:
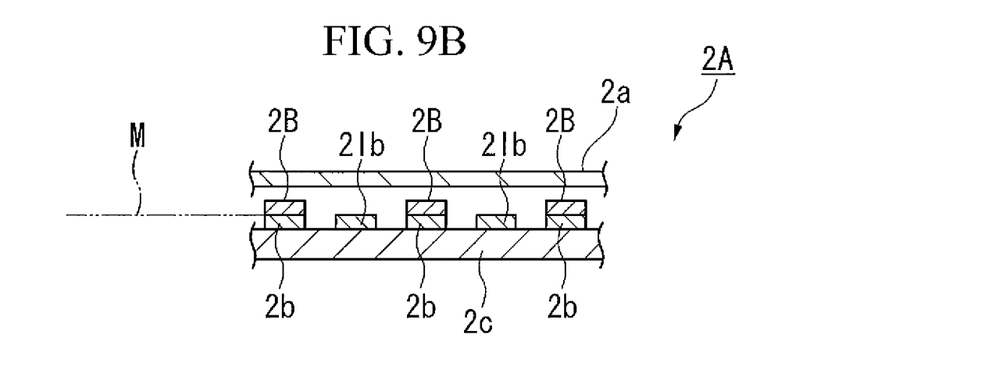
FIG. 9B is a cross-sectional view taken along a line C-C in FIG. 9A.

FIG. 9A shows a partially enlarged diagram illustrating an arrangement of unit light receiving sections in a focusing-state evaluation area of an imaging element used for a focus position control apparatus according to a variant of the first embodiment of the present invention. FIG. 9B shows a cross-sectional view taken along a line C-C in FIG. 9A.

The focus position control apparatus of the present embodiment includes an imaging element 2A in place of the imaging element 2 of the first embodiment. Hereinafter, differences between the present embodiment and the first embodiment will be described.

As shown in FIGS. 9A and 9B, the imaging element 2A includes an IR light receiving section 21IR in place of the IR light receiving section 20IR in a focusing-state evaluation area 20a of the imaging element 2.

The IR light receiving section 21IR includes a light receiving section 21b having sensitivity to only the infrared light.

According to a configuration of the present embodiment, an infrared-region image signal 201a can be generated by light-receiving luminance of the light receiving section 21b. Since the light receiving section 21b has sensitivity to only the infrared light, a wavelength selective filter, etc. is unnecessary, which can reduce light amount loss. As a result, since emission output of the infrared light source 10 can be reduced, the camera 100 with a small size and low power consumption can be obtained.

[Second Embodiment]

Next, a focus position control apparatus according to a second embodiment of the present invention will be described.

Figure 10:
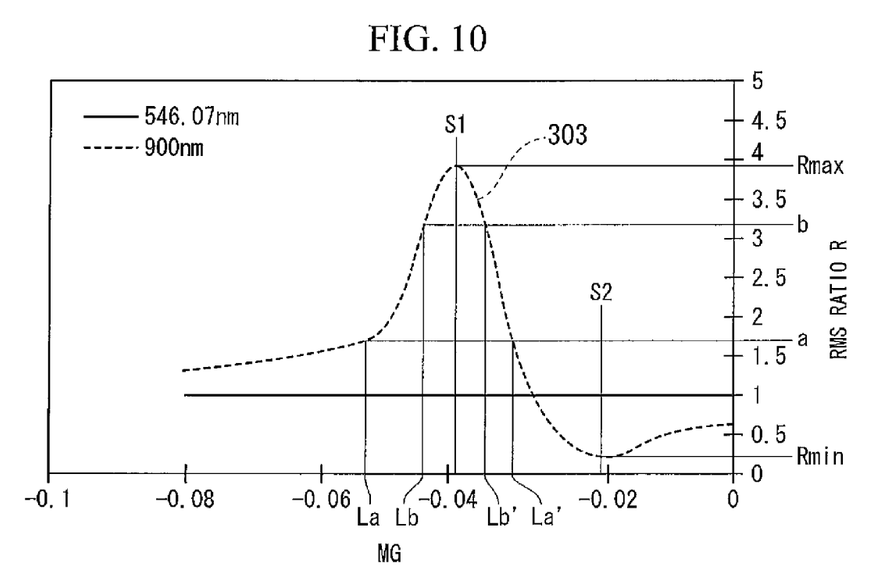
FIG. 10 is a diagrammatic graph showing a relationship between a focus position and a focusing evaluation value ratio in a focus position control apparatus according to a second embodiment of the present invention.

FIG. 10 shows a diagrammatic graph showing a relationship between a focus position and a focusing evaluation value ratio in a focus position control apparatus according to a second embodiment of the present invention. A horizontal axis indicates a position in an optical axis direction and a vertical axis indicates a focusing evaluation value.

The focus position control apparatus 110A of the present embodiment includes a focus position controller 4A in place of the focus position controller 4 in the focus position control apparatus 110 of the first exemplary embodiment, as shown in FIG. 1, and can be preferably used for the camera 100 of the first embodiment.

The focus position controller 4A includes a focusing state evaluator 40A in place of the focusing state evaluator 40 of the focus position controller 4. Hereinafter, differences between the second embodiment and the first embodiment will be described.

Since the focusing state evaluator 40A of the present embodiment performs image processing on the visible-region image signal 200a and the infrared-region image signal 201a to calculate focusing evaluation values from the image signals, like the focusing state evaluator 40 of the first embodiment, the focusing state evaluator 40A is configured, for example, of a computer, etc., like the focusing state evaluator 40.

However, the focusing evaluation value according to the present embodiment differs from that according to the first embodiment in that a ratio R of the focusing evaluation value based on the visible-region image signal 200a to the focusing evaluation value based on the infrared-region image signal 201a is calculated, after the focusing evaluation values are obtained based on the infrared-region image signal 201a and the visible-region image signal 200a, as in the focusing state evaluator 40 of the first embodiment.

As the respective focusing evaluation values for obtaining the ratio R, several evaluation values can be employed, as in the first embodiment. Hereinafter, the present embodiment will be described based on an example in which a spreading diameter of a light flux is an RMS value.

Further, the focusing state evaluator 40A evaluates the calculated ratio R based on reference data indicating a relationship between the ratio R and the focus position of the visible light, which is stored in the data storage 41, and calculates a movement amount in a direction along the optical axis for movement to the focusing position. The focusing state evaluator 40A sends information on the movement amount to the movement controller 43.

When movement completion is detected from the movement controller 43, the focusing state evaluator 40A also sends a focusing completion signal 210 to the imaging controller 3.

FIG. 10 shows an example of reference data stored in the data storage 41.

FIG. 10 is reference data corresponding to the example shown in FIG. 2 described in the first embodiment. When a focus position of the lens 1a having a focal length of 14.25 mm relative to an imaging plane M is set to a position of MG=−0.033 that is an intermediate state between infinitely distant and very near positions, a spreading diameter of a light flux from a photographing subject when object photographing from the very proximal position to the infinitely distal position is attempted is plotted as an RMS value. Here, a horizontal axis indicates lateral magnification MG corresponding to an object distance. A curve 303 shows a ratio R of a RMS value for a wavelength 900 nm in an infrared region to a RMS value for a wavelength of 546.07 nm in a visible region.

For such a curve 303, a value of the RMS value ratio R for position information is stored in the form of data or a data table indicating a proper function type in the data storage 41.

As indicated by the curve 303, the ratio R takes a minimum value Rmin at a position S2 where the lateral magnification MG=−0.022 as MG decreases to 0 to −0.022, and a maximum value Rmax at a position S1 where MG=−0.038 as MG increases to −0.022 to −0.038. The ratio R decreases along an S-shaped curve between MG=−0.038 and −∞ and shows an asymptotic curve at R=1. The curve 303 has a bottom portion and a top portion near the positions S2 and S1, respectively.

Here, the difference between the positions S1 and S2 is equal to a deviation amount of a focal length corresponding to the color aberration of the lens 1a.

Next, an operation of the focus position control apparatus 110A of the present embodiment will be described with respect to a focusing operation.

As in the first embodiment, when a visible-region image signal 200a and an infrared-region image signal 201a are sent from the imaging controller 3, the focusing state evaluator 40A calculates RMS values at the current position according to the respective image signals to calculate a ratio R between the RMS values. For example, the ratio R=a at a position La, and the ratio R=b at a position Lb.

For example, when R=a (where 1<a<Rmax) is obtained, the current position is down to two places La or La' from the curve 303.

Accordingly, the focusing state evaluator 40A sends the control signal to the movement controller 43 to drive the focus-position movement mechanism 5 and move the photographing lens unit 1 to an infinitely distal side or a very proximal side by a predetermined distance. The predetermined movement distance is a proper distance that does not exceed a smaller of a difference between the position La and the position S1 and a difference between the position La' and the position S1.

For example, assuming that the photographing lens unit 1 moves to the infinitely distal side (a positive direction on the graph) and arrives at the position Lb. At the position Lb, similarly, the visible-region image signal 200a and the infrared-region image signal 201a are acquired to obtain the ratio R at the position Lb. For example, R=b and a<b<Rmax in the shown state.

Accordingly, the focusing state evaluator 40A determines that a position before movement is the position La but not the position La'. This is because b<a when the position before movement, at which R=a, is the position La'.

Also, similarly, it can be seen that the current position after movement is not the position Lb' among positions at which R=b, but is a position Lb.

By doing so, the focusing state evaluator 40A acquires a distance between the current position Lb and the position S1, which is a focusing position, from the reference data stored in the data storage 41, and sends a control signal for movement to the position S1 to the movement controller 43.

Accordingly, the focus-position movement mechanism 5 is driven and the photographing lens unit 1 is moved to the position S1 that is the focusing position.

By doing so, focusing is completed.

With the focusing state evaluator 40A of the present embodiment, as the reference data based on the ratio of the focusing evaluation values is stored, a movement distance and a movement direction to the focusing position can be calculated from the ratio of focusing evaluation values at two positions acquired by at least two movements, for the autofocus operation. Accordingly, a fast autofocus operation can be performed since the number of the movements and the focusing evaluation can be greatly reduced, because a plurality of iterative movements and focusing evaluations are not required, such as a conventional hill climbing control scheme which a position passing the focusing position is searched for while iteratively evaluating the focusing state.

Also, since the focusing evaluation in the present embodiment can be performed at two positions apart from the focusing position S1, the autofocus operation can be performed by at least three movements similarly irrespective of the current position. Since each movement is a continuous operation in which the lens unit continuously moves by a given movement distance, much faster movement can be performed in comparison with a case where a unit movement is iteratively performed in a sub-step for intermittent movement by the same distance.

Also, in the present embodiment, the ratio of the focusing evaluation values for two wavelengths for which focusing positions are different is used as the reference data, for example, the reference data in the vicinity of focusing positions is more sharply changed than the focusing evaluation value used in the first embodiment. Accordingly, focusing position precision can be improved.

Next, a variant of the second embodiment will be described.

In the present embodiment, a curve representing a change rate of the curve 303 used in the second embodiment is employed as the reference data. The curve 303 is represented as R=H(x), where x is a position indicated by MG. Accordingly, the change rate r(x) of the curve 303 can be calculated as $r(x)=\{H(x+\Delta x)-H(x)\}/\Delta x$, where $\Delta x=C$ (constant). The change rate r(x) is unambiguously determined from the curve 303.

Here, the constant value C may take, for example, a minimum movement amount of the focus-position movement mechanism 5. For example, when the lens 1a is moved by MG=0.002, C=0.002.

When x is changed on the MG axis, the change rate r(x) is represented by a curve having a slope of approximately zero (extreme value=focusing position) at positions x of S1 and S2.

For example, in the case of the curve 303, when the lens 1a is moved at a constant speed from x=−0.1 to x=0, the change rate r(x) is changed as: postive→zero (S1)→negative→zero (S2)→positive. Since the change rate r(x) in the curve 303 corresponds to the position x in one-to-one correspondence, the change rate r(x) at the position x is stored as the data table.

The autofocus acquires the ratio R=a at the current position x=La and then R=b at a position Lb by moving the lens 1a to an infinitely distant side by Δx=0.002. From these values, the change rate r is calculated using r=(a−b)/(La−Lb). The change rate r at the position La is compared with r(x) on the data table to detect the position La. A movement direction and a movement distance to the focusing position S1 are obtained from the data table and the lens 1a is driven to the focusing position S1. Thus, the autofocus operation can be performed.

However, there is a case where the change rate r(x) is not a function specific to x due to the defocus property of the lens 1a. For example, in FIG. 10, since the change rate is positive in ranges of −0.08≦MG≦S1 and S2≦MG≦0, there is a case where a region to which the current position belongs cannot be determined. That is, there is a case where the position x does not correspond to the change rate r(x) in one-to-one correspondence.

In this case, since the position x can be recognized based on the defocus property of the lens 1a in advance upon building the data table, the position x can be detected (1) by selecting a value Δx=C so that the change rate does not overlap in those regions, or (2) by preparing complex table data with a ratio R=H(x) in addition to the change rate r(x) so that a combination between the change rate r(x) and the ratio R=H(x) with the position x is uniquely determined.

As described above, in the present embodiment, since the focusing position can be detected by calculating the change rate r of the focusing evaluation value ratio from the focusing evaluation values at two positions before or after one small movement, a fast autofocus operation can be performed.

Further, although the example has been described in which the first image signal is an image signal obtained by performing photoelectric conversion on the visible light and the second image signal is an image signal obtained by performing photoelectric conversion on the infrared light, image signals of proper wavelengths of light can be employed as the first and second image signals, respectively, as long as the wavelengths light have different wavelengths and a sufficient difference between color aberrations.

Also, although in the second embodiment, the example has been described in which the movement amount to the focusing position is obtained by calculating the ratio of focusing evaluation values at two positions and referring to the reference data, the photographing optical system may be driven in a certain direction to calculate the ratio of the focusing evaluation values at respective movement positions, a peak detection may be performed, for example, as in the hill climbing control scheme, and a focusing operation may be performed at a peak position of the ratio of the focusing evaluation values. In this case, since the focusing evaluation value ratio is more sharply changed than the focusing evaluation value, focusing detection sensitivity is excellent, and the focusing position can be detected even at a smaller number of focusing evaluations in comparison with a simple case where a peak of the focusing evaluation value is detected.

With the focus position control apparatus and the camera of the present invention, the focus position control is performed by evaluating the focusing state using lights having at least two different wavelengths or wavelength bands. Thus, a focus position control time can be shortened using a simple configuration.

According to the present invention, the imaging unit generates the at least first and second image signals by performing the photoelectric conversion on the lights having at least two different wavelengths or wavelength bands. The focusing state evaluator evaluates the focusing state in each wavelength or wavelength band based on the at least first and second image signals generated by the imaging unit. The movement controller drives the focus-position movement mechanism based on the evaluation result from the focusing state evaluator, for focus position control in the photographing optical system.

Since the first and the second image signals include focus state information by the two different wavelengths or wavelength bands, a distance from a focusing position can be evaluated by comparing these focusing states in consideration of color aberration of the photographing optical system.

According to the present invention, since the imaging unit generates the first image signal by performing the photoelectric conversion on visible light and the second image signal by performing the photoelectric conversion on infrared light, color aberration for one of the visible light and the infrared light becomes noticeable by using a photographing optical system having aberration corrected for the other of the visible light and the infrared light, thereby easily detecting a difference between focusing status. Accordingly, focus position control can be performed with high precision using a conventional general-purpose photographing optical system.

Further, since a general-purpose imaging element such as a CCD generally has sensitivity even to infrared light, the imaging unit can be configured at a low cost.

According to the present invention, one of the first and second light receiving sections can perform the photoelectric conversion on one of the lights having the at least two different wavelengths or wavelength bands to generate the first or second image signal. Accordingly, at least one of the first and second light receiving sections can generate the first or second image signal by one of the wavelengths or wavelength bands without performing wavelength selection using, for example, a filter and accordingly without light amount loss.

According to the present invention, since the data of the defocus property of the photographing optical system is stored in the data storage, the focusing state can be rapidly evaluated. Also, a plurality of defocus property data is stored in the data storage in advance or when required. Accordingly, for example, even when the photographing optical system is replaced or the focal length of the photographing optical system is changed, corresponding focus position control can be performed.

Although the preferred embodiments of the present invention have been described, the present invention is not limited to the embodiments. Additions, omissions, substitutions, and any other modifications may be made to the configuration of the present invention without departing from the spirit of the present invention. The present invention is not limited by the above-described description, and is limited by only claims.

The invention claimed is:

1. A focus position control apparatus comprising:
   a photographing optical system for forming a subject image using light from a subject;
   an imaging unit for generating at least first and second image signals by performing photoelectric conversion on the subject image formed by the photographing optical system on an imaging plane with lights having at least two different wavelengths or wavelength bands;
   a focus-position movement mechanism for moving the photographing optical system in a direction along an optical axis relative to the imaging plane of the imaging unit;
   a focusing state evaluator for evaluating a focusing state in each wavelength or wavelength band based on the at least first and second image signals generated by the imaging unit; and
   a movement controller for driving the focus-position movement mechanism based on an evaluation result from the focusing state evaluator, wherein
   the focusing state evaluator includes a data storage for storing data of a defocus property of the photographing optical system in the at least two different wavelengths or wavelength bands, and the focusing state evaluator evaluates the focusing state from the first and second image signals based on the data of the defocus property stored in the data storage.

2. The focus position control apparatus according to claim 1, wherein the imaging unit generates:

the first image signal by performing the photoelectric conversion on visible light; and the second image signal by performing the photoelectric conversion on infrared light.

3. The focus position control apparatus according to claim 1 or 2, wherein the imaging unit comprises:

an imaging element for performing the photoelectric conversion; and a wavelength selection unit for selecting a wavelength of the light from the photographing optical system on a light path between the imaging element and the photographing optical system.

4. The focus position control apparatus according to claim 1 or 2, wherein the imaging unit comprises an imaging element including first and second light receiving sections having a different relative wavelength sensitivity, one of the first and second light receiving sections has a greater relative sensitivity to one of the lights having at least two different wavelengths or wavelength bands, and the one of the first and second light receiving sections performs the photoelectric conversion on the one of the lights having at least two different wavelengths or wavelength bands to generate the first or second image signal.

5. A camera comprising the focus position control apparatus of claim 1 or 2.

6. A camera comprising the focus position control apparatus of claim 3.

7. A camera comprising the focus position control apparatus of claim 4.

* * * * *